Figure 3:
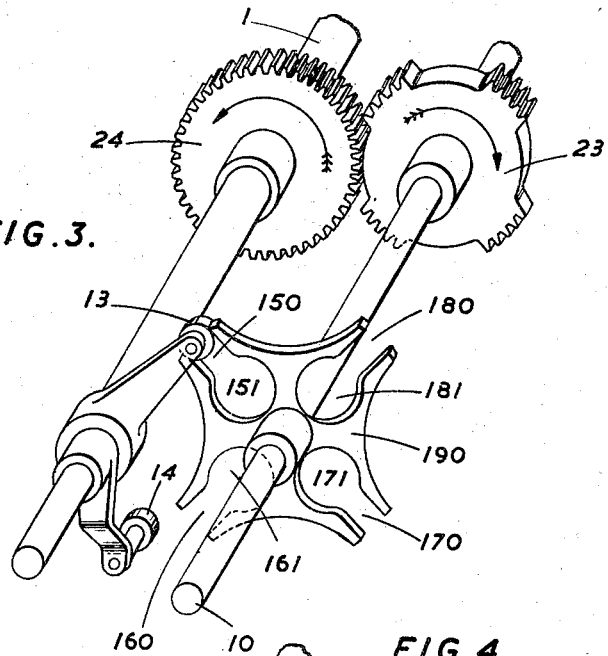

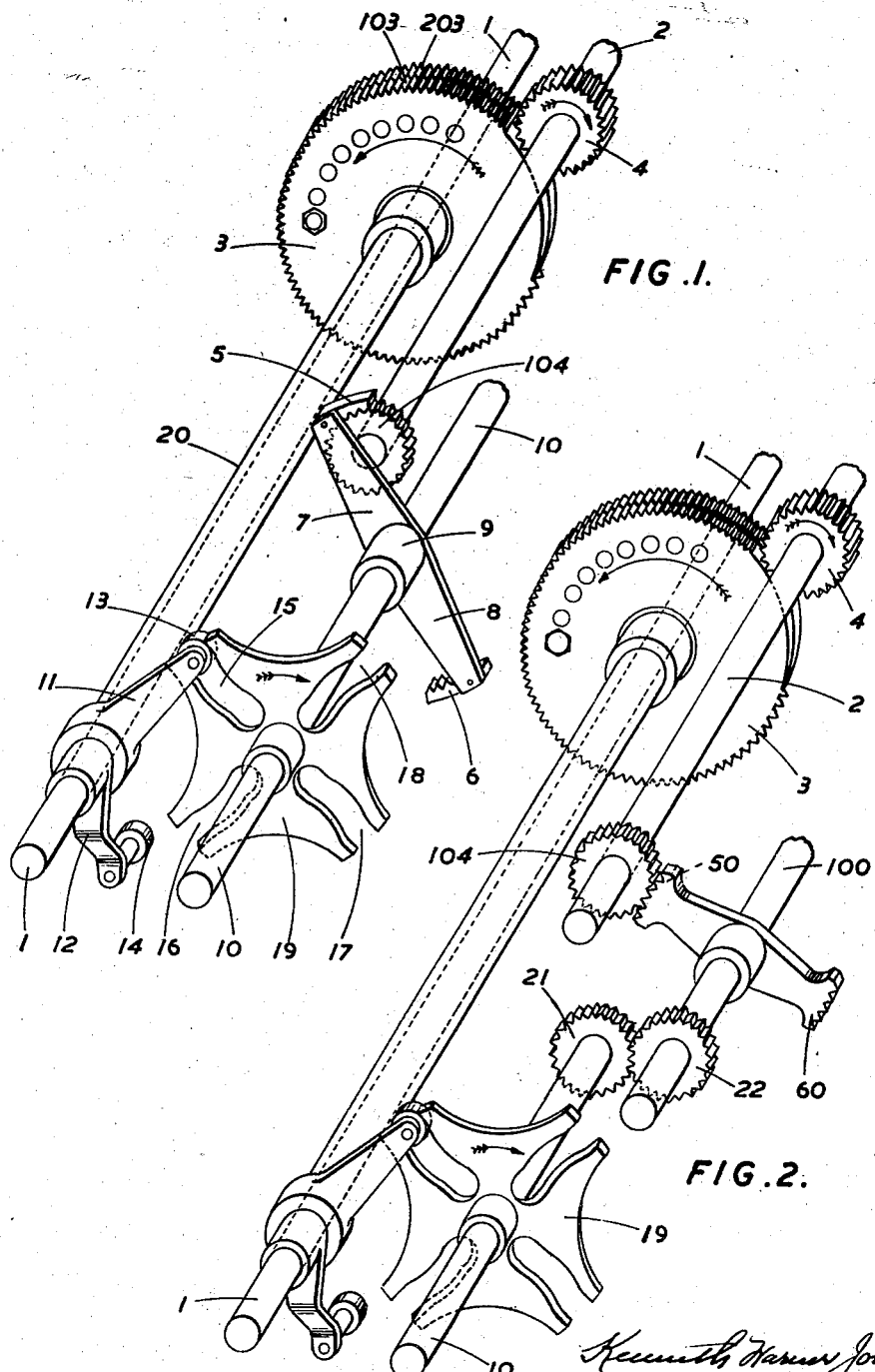

Sept. 21, 1948.  K. W. JONES  2,449,852
GEAR DRIVE FOR PRINTING AND OTHER MACHINES
Filed Aug. 3, 1944  2 Sheets-Sheet 2

UNITED STATES PATENT OFFICE 2,449,852

GEAR DRIVE FOR PRINTING AND OTHER MACHINES

Kenneth Warner Jones, Enfield, England, assignor to K. Warner-Jones and Company Limited, London, England Application August 3, 1944, Serial No. 547,887
In Great Britain August 16, 1943

3 Claims. (Cl. 74—435)

This invention relates to gear drives for printing, book-binding and other machines of the kind in which during the working of the machine a part or parts thereof is or are driven intermittently by or from the main driving gear of the machine.

Conventionally to obtain the requisite intermittent drive a mutilated gear or gears is or are incorporated in the machine; this gear commonly comprises an input or driving gear having a number of teeth cut away to constitute a mutilated gear and an output or driven gear which is actuated by the remaining teeth of said mutilated gear. As will be understood, rotation of the driven gear takes place only when the teeth of the mutilated driving gear are meshed with the teeth of the driven gear, the latter remaining stationary during that portion of a revolution of the driving gear in which the cut-away or smooth peripheral portion of the such gear is passing over the toothed periphery of the driven gear and until the leading tooth of the mutilated driving gear engages a tooth of the driven gear, whereupon the latter revolves until the trailing tooth of the driving gear comes out of engagement with the driven gear, when the latter again ceases to rotate, the described cycle of operations being repeated as the working of the machine proceeds.

Mutilated gearing of the kind referred to, for effecting an intermittent drive of a part of a machine, whilst capable of operating reasonably satisfactorily under certain conditions of working, suffers from a number of disadvantages, one of which is that when running at any appreciable speed, the driving gear must be slowed down at the moment its first tooth engages with the stationary driven gear to give a relatively quiet entry and avoid excessive wear and strain on the parts which would occur if the leading tooth of the driving gear should hit a tooth of the stationary driven gear at full speed at the moment of engagement of the two gears. Further, unless a second slow-down is given to the driving gear at the time the trailing or last tooth of such gear runs out of engagement with the driven gear, the said driven gear and its associated mechanism is left running at full speed, and excessive braking must be applied in order to bring the driven gear and associated mechanism to a relatively instantaneous stop at the time the driving gear disengages, it being understood that if the driven gear is not brought to a dead stop (i. e. if it overruns) said driven gear may not be in correct position for the leading tooth of the driving gear to re-engage with the result that the teeth will "clash" instead of re-engaging.

In addition, there is usually excessive wear of the leading and trailing teeth of the mutilated gear of the conventional drive incorporating such a gear, and for this reason, as well as for the reasons set out in the preceding paragraph, the conventional mutilated intermittent gear drive is suitable only for use in machines running at slow speeds.

It is an object of the present invention to provide an improved intermittent gear drive of the mutilated gear type in which, notwithstanding that rotary motion is imparted to the driven gear primarily by the mutilated gear, the driven gearing shall be at all times in mesh with gearing deriving movement from the main input or driving shaft of the machine, thus enabling the machine to be run at high speeds without the use of slowdown gearing or the like, and ensuring that at the time for re-engagement of the driving and driven gears the latter will be correctly positioned for the leading tooth of the driving gear to re-engage therewith.

According to this invention there is combined with a conventional mutilated driving gear and the driven gear receiving intermittent rotary motion therefrom, a gear element brought into mesh with the driven gear before the mutilated gear is disengaged from the latter and remaining so meshed with the driven gear until after the mutilated gear is re-engaged therewith, said gear element and mutilated driving gear deriving movement from a common power input, and mechanism whereby the gear element, and therethrough the driven gear, is brought to rest after the mutilated gear has disengaged from the said driven gear and is set in motion, thereby to rotate the driven gear, before the latter is re-engaged by the mutilated gear, which re-engagement thus takes place with the driven gear already in motion.

In carrying the invention into practice there is provided an intermittently rotated gear element having one or more toothed segments or segmental portions, which mesh with the driven gear or a gear rotating therewith, and this segmented gear is driven intermittently by appropriate means. Thus, for example, a gear may be provided, having on its otherwise plain periphery spaced groups of teeth co-operating with the driven gear or a gear operatively coupled thereto to rotate therewith, or, alternatively, groups of teeth forming gear segments may be carried by arms from a shaft and co-operate with the driven gear. In either case there is constituted in effect a multiple mutilated gear, and this gear is actuated to bring a group of teeth into engagement with the driven gear before the trailing tooth of the mutilated driving gear leaves the teeth of the driven gear and to remain stationary until the leading tooth of the driving gear approaches the driven gear when it will start the latter so that it is rotating as the mutilated gear meshes with it, the teeth of the respective segment being disengaged from the driven gear, or its associated gear, leaving the latter free to rotate, as soon as meshing of the driving and driven gears has taken place. While the driven gear is rotated by the driving gear, the multiple mutilated gear or equivalent, when rotated sufficiently to bring another group of teeth a predetermined distance towards the position to engage the driven gear, or its associated gear, at the appropriate time, remains stationary in a position to allow the driven gear to rotate.

Intermittent braking may be applied to the driven gear and associated mechanism to absorb the momentum of the moving parts when brought to rest by the segment gear and thus lessen the strain on these parts.

Means of an "escapement" type may be incorporated in the gearing to accurately register the position of the driven gear and associated mechanism after said gear has ceased to revolve, thus further relieving the work and strain on the segment gear or equivalent mechanism. The escapement mechanism would lock the driven gear in a positive position when brought to rest.

In the accompanying drawings:

Fig. 1 illustrates a driving gear according to one embodiment of the invention, in which the gear element which meshes with the driven gear before the mutilated driving gear disengages therefrom, and disengages from the driven gear after the said mutilated driving gear has re-engaged therewith, is an internally toothed segment gear.

Figure 4:
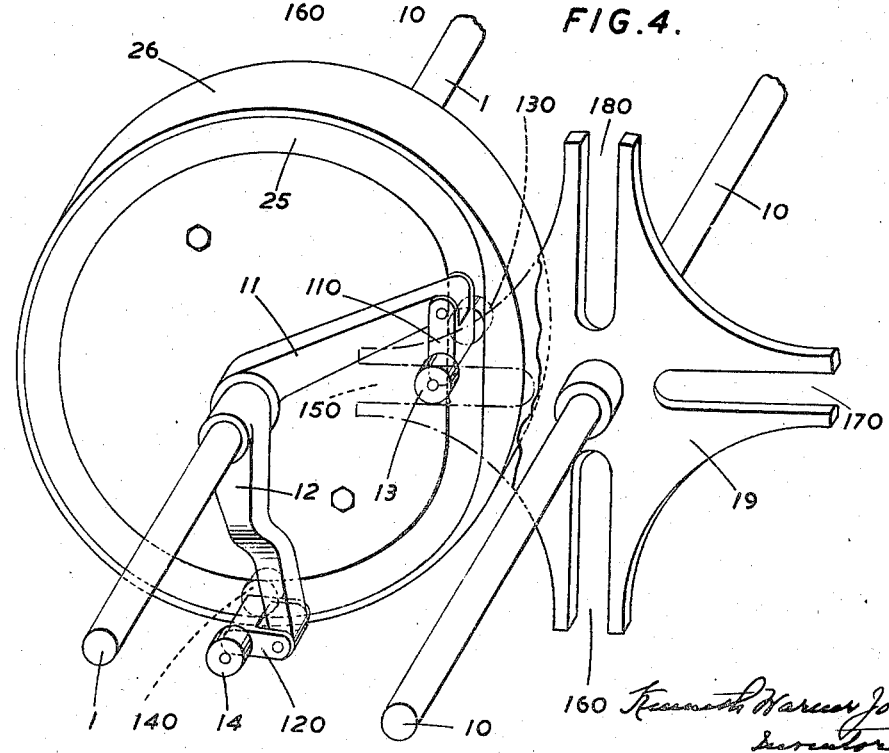

Fig. 2 is a view of a driving gear identical with that shown in Fig. 1 except for the slight constructional variation necessitated by the employment of an externally toothed segment gear as the gear element associated with the driven gear, and Figs. 3 and 4 are fragmentary views showing modified forms of driving mechanism for the segment gear element comprised in the driving gear according to the invention.

Referring firstly to Fig. 1 of the drawings, 1 is a power input or main driving shaft of the machine, and 2 the output or driven shaft. Fast with the shaft 1 is a mutilated driving gear 3 operating to rotate intermittently a driven gear 4 fast with shaft 2. Also fast with shaft 2 is a gear 104 of the same diameter and with the same number of teeth as the gear 4.

Operatively associated with the gear 104 are two diametrically oppositely disposed segment gears 5, 6 carried by radial arms 7, 8 extending from a boss 9 fast with a layshaft 10 parallel with the shafts 1 and 2. Mounted on the power input shaft 1, and in driving connection therewith, are two arms 11, 12 carrying rollers 13, 14 disposed for driving engagement with slots 15, 16, 17, 18 in a cam-plate or star wheel 19 fast with the layshaft 10, the roller 13 co-operating with the slots 15, 17 and the roller 14 with slots 16, 18 in the course of the cycle of operations of the apparatus.

In Fig. 1, and also in the other figures of the drawings, the various gears of the apparatus are shown spaced apart along the respective shafts for convenience of illustration, but it is to be understood that in practice the gearing would be arranged as compactly as possible.

The number of teeth on each segment is relatively small, and each such gear is arranged so that in its rotational movements its teeth are brought into and out of mesh with the gear 104 as requisite in the operation of the gearing, such operation being as follows:

Assuming the machine to be running and the parts to be in the position in which the mutilated driving gear 3 has just run out or disengaged from the driven gear 4 and the latter to be stationary, the segment gear 5 will have been brought into engagement with the gear 104 by the operation of the cam mechanism, and the appropriate cam roller 13, which may be termed the run-out roller, will be at the open end of and about to leave the respective slot 15, which may be termed the run-out slot, of the star-wheel 19. The star-wheel and the segment gear will have come to rest, and in consequence of the cessation of movement of the segment gear the driven gear 4 will also have ceased to rotate. The driving shaft 1 continues to rotate, and with it the mutilated gear 3 and the arms 11, 12 carrying the cam rollers. After moving through the predetermined arc the cam roller 14 carried by the arm 12, which may be termed the run-in roller, will enter the next cam slot 16 in the star-wheel, and which conveniently may be referred to as a run-in slot, and the star-wheel 19 and the lay shaft 10 will begin to revolve thus driving the segment gear 5 and setting in motion the gears 104 and 4. By the time the leading tooth of the mutilated gear 3 reaches the position to re-engage the driven gear 4 the latter will be running at the same speed as the mutilated gear and be in the correct position relative thereto for the re-engagement of these gears to take place. As the mutilated and driven gears become meshed, the segment gear 5 leaves the gear 104, and by the time the run-in roller 14 reaches the open end of the run-in slot 16 in the star-wheel the lay shaft 10 will have ceased to rotate and will remain stationary until the run-out cam roller 13 enters the next slot 17 in the star-wheel. This slot is a run-out slot and is diametrically opposite the previously referred to run-out slot 15. Rotation of the lay shaft 10 will have commenced and when the speed of the segment gear 6 reaches that of the driven gear 4 it will be brought into mesh with the gear 104, whereupon the trailing tooth of the mutilated gear 3 runs out of engagement with the driven gear 4. The run-out cam roller 13 continues to travel in the run-out cam slot 17 and when it reaches the end of the slot the rotation of the lay shaft 10 will have ceased, the roller will pass out of the slot, and the described cycle of operation will be repeated.

The amount of rotation imparted to the driven gear 4 by the driving gear 3 at each revolution of the latter depends upon the number of teeth which the driving gear has, and any appropriate means may be adopted to avoid having to change the driving gear each time a different rotation is required. As shown, the driving gear 3 is built up of two toothed discs or gear elements 103, 203 bolted together and rotatably mounted in relation to each other so that the teeth may be "fanned out" as required. It will be understood that the mechanism controlling the segment gear would also be made adjustable to accommodate the difference in the number of operative teeth on the driving gear, and in the apparatus according to the already described embodiment of the invention the arms or levers 11, 12 carrying the run-in and run-out cam rollers 13, 14 are operatively connected to and fast with the respective discs or gear elements 103, 203 comprised in the mutilated gear. As shown, the lever 12 and the gear element 203 are fast on the driving shaft 1 and the lever 11 and gear element 103 are fast with a sleeve 20 on and rotatably adjustable about said shaft 1.

The shape of the cam tracks or slots 15, 16, 17, 18 in the star-wheel or cam-plate 19 is determined so that the movements imparted to such plate by the respective cam rollers give to the segment gears and the driven gear 4 the requisite speed of rotation at the appropriate time to ensure that the driven gear 4 and the mutilated driving gear 3 are running at the same speed at the moment of re-engagement. The tracks or slots in the plate 19 may be straight and extend radially from the axis of the plate, but preferably they are curved as shown as this formation will permit a greater number of teeth on a segment to be used to set in motion and bring to the requisite speed the driven gear 4.

In the embodiment of the invention described the segments are internally toothed, but if desired externally toothed segment gears may be employed, in which case an intermediate gear would be introduced at some point between the interruptable driving mechanism, i. e. the cam rollers and cam-plate, and the driven gear—for example between the gear wheel 104 with which the segment gears mesh and the driven gear—to bring the direction of rotation of the latter gear effected by the segment gears into correct relation with that of the mutilated driving gear. Conveniently, and as shown in Fig. 2, where externally toothed segment gears 50, 60 are employed, two lay shafts 10 and 100 are provided, the segment gears being fast with the shaft 100 and the cam-plate with shaft 10. The latter shaft carries a gear wheel 21 meshing with a similar wheel 22 on shaft 100. Gear 21, driven by the cam plate 19 rotates in a clock-wise direction and drives gear 22 and thus the segment gears 50, 60 in an anti-clockwise direction, the latter gears rotating the gear 104, and thus the driven gear 4 in the clockwise direction as requisite.

The start-up and acceleration and the slow-down or deceleration of the driven gear 4 effected when the cam rollers enter and leave the cam slots in the cam-track member 19, and the requisite brief periods of constant speed of the driven gear when not engaged with the mutilated driving gear 3, may be obtained by the means shown in Fig. 3 in which a plurally mutilated gear 23 on the lay shaft 10 co-operates with a gear 24 on the driving shaft 1, and the slots in the driving plate 190 have straight radially-disposed open end portions 150, 160, 170 and 180 for the entry and exit of the cam or driving rollers 13, 14 and enlargements or clearance spaces respectively marked 151, 161, 171 and 181 at the ends nearer the axis of the driving plate, in the appropriate one of which the respective roller may move freely when a toothed portion of the plurally mutilated gear 23 is meshed with its associated gear 24.

Assuming the parts in the position shown in Fig. 3, continued rotation of shaft 1 will bring the run-out driving roller 13 out of the slot 150 and on the run-in roller 14 entering the slot 160 the lay shaft 10 will be started up and bring the respective toothed portion of the gear 23 into mesh with the gear 24, by which time the gear 23 will have reached constant speed, and for the requisite brief period the shaft 10 and thus the segment gears 5, 6, Fig. 1, or 50, 60, Fig. 2, will run at that speed and revolve the driven gear 4 also at constant speed. During this interval the roller will move freely in the enlargement or clearance space 161 and on it again entering the straight portion 160 of the slot the plurally mutilated gear 23 will have become disengaged from the gear 24 and the plate or star wheel 190 will be decelerated, as also will be the segment and driven gears, and as the said roller leaves the said slot the latter gears will be brought to rest.

Instead of obtaining the requisite periods of constant speed of the driven gear 4, when the same is being driven by the interruptable driving mechanism, by means of cam-slots in the driving plate 19 as in Figs. 1 and 2, or the plurally mutilated gear 23 as in Fig. 3, the driving plate 19 may have straight radially disposed slots 150, 160, 170 and 180 as shown in Fig. 4, and the driving rollers 13, 14 be arranged to be moved towards and away from the rotational centre of the plate 19, i. e. the shaft 10. In the arrangement shown in Fig. 4, the rollers 13, 14 are carried by members 110, 120, pivotally mounted at the ends of the arms 11, 12 on the shaft 1 and coaxial with the rollers 13, 14 are additional rollers 130, 140 running in a cam-track 25 in a fixed cam-plate 26.

What I claim is:

1. In gearing for driving intermittently a part of a machine, the combination with a driven gear intermittently rotated by a mutilated driving gear continuously rotated by the power input of the machine, of a pinion fast with said driven gear, a gear element meshing with said pinion before the disengagement of the mutilated gear from the driven gear and disengaging from said pinion before the driven gear is re-engaged with said mutilated gear, and interruptible driving mechanism between the power input of the machine and said gear element to drive the latter intermittently and at varying speed to decelerate such pinion and thus the driven gear after the mutilated driving gear has disengaged from the latter and thereafter to stop said pinion and driven gear, hold them stationary, re-start them, and accelerate their peripheral speed into synchronism with that of the mutilated driving gear and bring the teeth of the driven gear into meshing relation with those of the driving gear before it is re-engaged by the said latter gear.

2. In gearing for driving intermittently a part of a machine, the combination with a driven gear intermittently rotated by a mutilated driving gear continuously rotated by a power input shaft of the machine, of a pinion fast with said driven gear, a pair of intermittently driven segment gears disposed diametrically opposite each other relative to their common axis of rotation and meshing alternately with said pinion, the respective segment gear being brought from a position of rest into mesh with said pinion before the mutilated driving gear is disengaged from the driven gear and remaining meshed with such pinion while the driven gear is stationary and until after the driving gear is re-engaged therewith, and interruptible driving mechanism operative to drive said segment gears intermittently and at varying speed from said power input shaft and effective after the mutilated driving gear has disengaged from the driven gear to slow down said segment gears and thus the pinion and driven gear and bring the same to rest, and before re-engagement of the mutilated driving and driven gears to bring the peripheral speed of the driven gear into synchronism with that of the mutilated driving gear and its teeth into meshing relationship with those of the latter gear, and when said re-engagement has taken place to disengage the respective segment gear from said pinion and bring said segment gear to rest.

3. In gearing for driving intermittently a part of a machine, the combination of a continuously rotated input shaft, a mutilated driving gear fast therewith, a driven gear rotated intermittently by said mutilated gear, a pinion fast with said driven gear, a segment gear alternately meshing with and disengaging from said pinion, and an interrupted driving gear operative to drive said segment gear intermittently and at varying speed from said power input shaft and comprising a cam-plate fast with said segment gear, a pair of cam slots disposed substantially radially of said cam-plate, and means on the power input shaft mounting a pair of driving rollers which cooperate with said slots to drive said plate.

KENNETH WARNER JONES.

REFERENCES CITED

The following references are of record in the file of this patent:

UNITED STATES PATENTS

| Number | Name | Date |
|---|---|---|
| 2,175,311 | Preston | Oct. 10, 1939 |